United States Patent [19]

Varadi et al.

[11] 3,736,657

[45] June 5, 1973

[54] METHOD OF MANUFACTURING A TRANSDUCER HEAD FOR MAGNETIC RECORDING/REPRODUCING APPARATUS

[76] Inventors: Peter F. Varadi, 10500 Rockville Pike, Stamford, Conn. 20852; Laslo Gabor Sebestyen, 41 Ashbourne Road, London, England

[22] Filed: June 22, 1971

[21] Appl. No.: 155,632

Related U.S. Application Data

[60] Division of Ser. No. 870,293, Nov. 28, 1969, Pat. No. 3,641,281, which is a continuation of Ser. No. 390,435, Aug. 18, 1964, Pat. No. 3,495,045.

[52] U.S. Cl. ..............................29/603, 179/100.2 C

[51] Int. Cl. ..............................H01f 7/06

[58] Field of Search ..................29/603; 179/100.2 C; 346/74 MC; 340/174.1 F

[56] References Cited

UNITED STATES PATENTS

| | | | |
|---|---|---|---|
| 3,411,202 | 11/1968 | Schwartz | 29/603 |
| 3,228,092 | 1/1966 | Van Langen et al. | 29/603 |
| 3,246,384 | 4/1966 | Vice | 29/603 |

*Primary Examiner*—Charles W. Lanham
*Assistant Examiner*—Carl E. Hall

[57] ABSTRACT

A magnetic recording/reproducing head is formed to provide a controlled non-magnetic transducer gap by bonding prefinished pole faces with a thin layer of transferable bonding material to form a unitary structure.

6 Claims, 3 Drawing Figures

INVENTORS
PETER F. VARADI
L. GABOR SEBESTYEN

METHOD OF MANUFACTURING A TRANSDUCER HEAD FOR MAGNETIC RECORDING/REPRODUCING APPARATUS

This invention is a division of the copending application, Ser. No. 870,293 filed Nov. 28, 1969, now U.S. Pat. No. 3,641,281 which is a continuation of the application Ser. number 390,435 filed Aug. 18,1964, now U.S. Pat. No. 3,495,045 entitled: Transducer Head for Magnetic Recording/Reproducing Apparatus.

The invention pertains to a transducer head for magnetic recording and reproducing apparatus and is particularly suitable for recording and reproducing very high frequency signals which occur—among others—in predetection recording of radar signals or recording and reproducing television programs on magnetizable medium.

The capability of the magnetic head of reproducing very high frequencies or, as they appear on the magnetizable medium, very short wavelengths is primarily determined by the non-magnetic transducer gap in the head and the core material. For satisfactory reproduction of a recorded signal the transducer head in the reproducer head must be considerably less than the wavelength on the medium. A numerical example will illustrate the order of magnitudes. Let us assume that the recorded signal is 5 Mc/s and that the head-to-medium speed is 1000 inch/sec. Even at that high relative speed the recorded wavelength is 200 microinch long and it is desirable to keep the reproducer head gap to say 100 microinches. In the past shims of nonmagnetic materials such as phosphor-bronze or aluminum have been positioned between the confronting end faces which are defining the boundaries of the physical gap. Whereas such foils are commercially produced, their assembly needs highly skilled labor and it appears that below 100 microinches thickness the production and application of foils runs into serious practical difficulties.

An alternative to the thin-foil method is the electroplating; this method is not considered suitable because of the edge effect, i.e. the thickening of the plating along the edges.

Another alternative is the vacuum-depositing of non-magnetic materials such as gold, silicon or silicon monoxide. The difficulty in maintaining a controlled and uniform thickness by vacuum depositing is well known by those conversant with this art; however, up to now this has been the most successful way of producing thin gaps in spite of the expensive and complicated process.

The object of the invention is to provide a magnetic head with a very short and controlled non-magnetic transducer gap.

A further object of the invention is to provide this gap by a method suitable for mass production.

Another object of the invention is to provide the gap in such a manner which disposes with the spring or retainer or casting which is necessary when applying any of the previously known methods.

Figure 1:
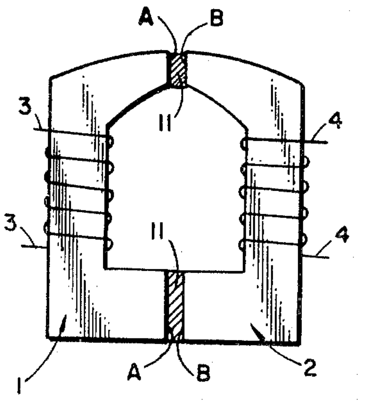

The invention will be readily understood by way of an example, reference being made to the accompanying drawing in which FIG. 1 is the side view of a magnetic head. In FIG. 1 the first pole piece 1 and the second pole piece 2 each are carefully lapped on surfaces A and B and are wound with coils 3 and 4. The core material may be any high permeability material such as Mu-metal, ferrite etc. The transducer gap 11 is formed by a layer of glass which forms an inseparable bond with the core material. Whereas in the past attempts have been made to use glass as gap spacer material, technological difficulties prevented it from becoming a practical proposition.

The gap, according to the invention, is formed by means of a heavily loaded plastic foil which is called "transfer tape". This heavily loaded transferable tape can be prepared from glass, glazing or ceramic material to accurate thickness.

The transferable tape is prepared by laminating a slurry containing a suitably low particle size powder onto a carrier film. The thickness and density of this laminated layer can be accurately controlled prior to its application. The layer of the heavily loaded tape can then be transferred from its carrier to the pole faces of the magnetic transducer head to be coated, either by heat or by using a suitable solvent or by utilizing an adhesive layer. The latter appears to be the method most suitable to mass production and will be described in detail.

A typical transferable tape, thus, consists of:

a. A thin, uniform carrier film of materials such as polyethylene, polyvinylchloride or teflon;

b. A heavily loaded layer of glass, glazing, or ceramic powder in a binder such as nitrocellulose, polybutylmethacrylate or polyvinylalcohol and plasticizer. The ratio of these components can be varied according to the shape of the pole pieces from 98 percent solid powder and 2 percent plastic material to 36 percent solid powder and 64 percent plastic material.

c. And adhesive layer such as starch, synthetic rubber or polyvinylalcohol.

The preparation of the transferable tape is per se known and not claimed as an invention.

Figure 3:
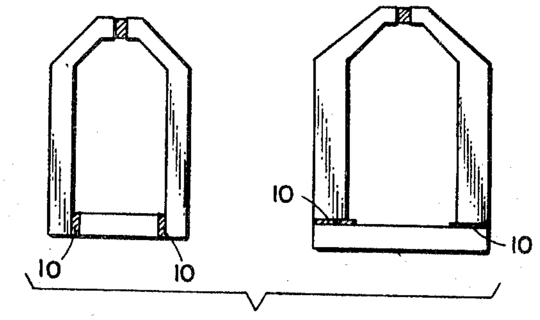
Figure 2:
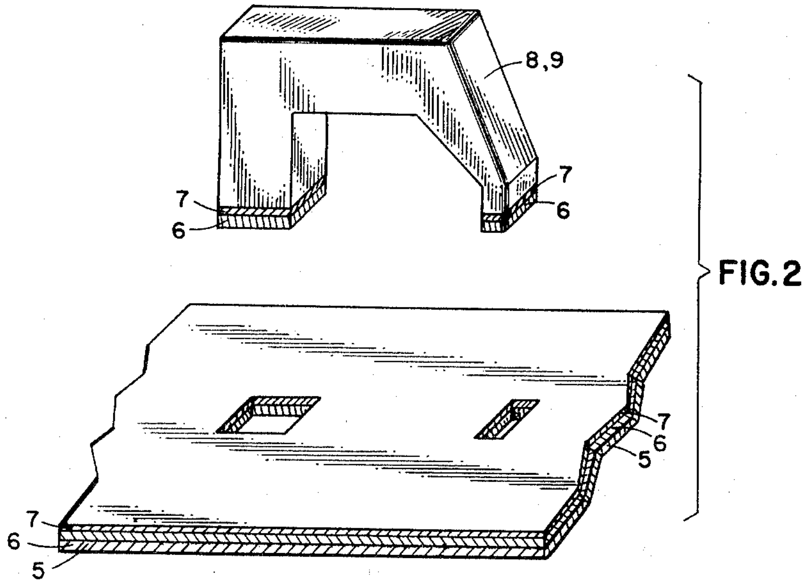

The application of transferable tape will be more readily understood on hand of FIGS. 2 and 3.

In FIG. 2 the carrier film 5 which can be e.g. polyethylene, polyvinylchloride or teflon carries the heavily loaded layer 6 which is glass, glazing or ceramic powder uniformly distributed in a film-forming material such as nitrocellulose, polyacrylates or polyvinylacetate. A further layer 7 is an adhesive such as starch, synthetic rubber or polyvinylalcohol.

The transducer gap is prepared by bringing the ferrite head in contact with the transfer tape under small pressure. On removing the ferrite head from the carrier film, the heavily loaded layer will adhere to the area of the ferrite head which was in contact with the tape. The transducer gap can now be completed by pressing according to the desired gap thickness a clean or a similarly treated part 9 against part 8 and holding them in position while the parts are heat treated at a temperature on which the transfer tape decomposes and its glass, glaze or ceramic content creates a solid bond between the ferrite parts.

An alternative construction method is shown in FIG. 3 where there are two "back gaps" 10 instead of one. As well known to those skilled in the art of tape recording, on replay head it is desirable to keep the back gap as small as possible whereas on recording head a back gap different from zero is sometimes desirable in order to avoid saturation of the heat material.

The glass, glazing or ceramic material can be selected according to the composition of the ferrite or other high-permeability material which is normally used for magnetic record/reproducer heads. As an example, glass frits made by grinding lead glasses such as Corning 7570 glass and glass sorts sold under the trade name of Pyroceram by Corning Glass Works or soda-potash glasses were successfully utilized.

The transfer tape method can be used also for providing a very thin insulating layer on the ferrite or other magnetic head material underneath the coil.

Whereas in the description we referred to "glass, glazing or ceramic" materials as the application of transfer tape method offers the greatest advantage at those, the method can be equally well applied to provide a non-magnetic but electrical conductor gap such as Gold, Silver, Platinum or Copper, or the same materials intermixed with suitable flux.

Since many changes could be made in the specific combinations of materials disclosed herein and many apparently different embodiments of this invention could be made without departing from the scope thereof, it is intended that all matter contained in the foregoing description or shown in the accompanying drawings shall be interpreted as being illustrative and not in a limiting sense.

What we claim is:

1. A method of manufacturing a magnetic recording-/reproducing head comprising a prefinished core of magnetic material having at least two pole faces defining at least one gap wherein said pole faces are intimately secured comprising the steps of:

A. Transferring a thin layer of bonding material of a previously prepared transferable tape or strip to at least one of the pole faces of said prefinished core;
B. Bringing in contact the two pole faces, at least one of them coated with bonding material; and
C. Heating to cause said material to bond itself and the pole faces together.

2. A method as claimed in claim 1 in which the bonding material is transferred to the pole faces by utilizing heat.

3. A method as claimed in claim 1 in which the bonding material is transferred to the pole faces by utilizing a suitable solvent.

4. A method as claimed in claim 1 in which the bonding material is transferred to the pole faces by utilizing an adhesive layer.

5. A method of manufacturing a magnetic recording-/reproducing head comprising a prefinished core of magnetic material having at least two pole faces defining at least one gap wherein said pole faces are intimately secured comprising the steps of:

A. Lapping the pole faces;
B. Transferring a thin layer of bonding material of a previously prepared transferable tape or strip to at least one of the lapped pole faces;
C. Bringing in contact the two pole faces, at least one of them coated with bonding material; and
D. Heating to cause said material to bond itself and the pole faces together.

6. A method of manufacturing a magnetic recording-/reproducing head comprising a prefinished core of magnetic materials having at least two pole faces defining at least one gap wherein said pole faces are intimately secured comprising the steps of:

A. Transferring a thin layer of bonding material of a previously prepared transferable tape or strip to at least one of the pole faces;
B. Bringing in contact the two pole faces, at least one of them coated with bonding material; and
C. Applying pressure to the pole faces and holding them in position while they are heated to cause the bonding material to bond itself and the pole faces together.

* * * * *